(12) United States Patent
Gibart et al.

(10) Patent No.: US 9,898,611 B2
(45) Date of Patent: Feb. 20, 2018

(54) METHOD AND APPARATUS FOR SCRAMBLING A HIGH SPEED DATA TRANSMISSION

(71) Applicant: Rockwell Automation Technologies, Inc., Mayfield Heights, OH (US)

(72) Inventors: Anthony G. Gibart, New Berlin, WI (US); Kenwood H. Hall, Hudson, OH (US); Robert E. Lounsbury, Chardon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 89 days.

(21) Appl. No.: 14/672,825

(22) Filed: Mar. 30, 2015

(65) Prior Publication Data
US 2016/0292426 A1    Oct. 6, 2016

(51) Int. Cl.
*G06F 12/14* (2006.01)
*G06F 21/60* (2013.01)
*G06F 21/85* (2013.01)
*G09C 1/00* (2006.01)
*H04L 9/06* (2006.01)
*G06F 13/42* (2006.01)
(Continued)

(52) U.S. Cl.
CPC ............ *G06F 21/602* (2013.01); *G06F 13/42* (2013.01); *G06F 21/85* (2013.01); *G09C 1/00* (2013.01); *H04B 15/04* (2013.01); *H04L 9/0668* (2013.01); *H04L 9/0869* (2013.01); *H04L 2209/34* (2013.01)

(58) Field of Classification Search
CPC ..... G06F 21/602; G06F 13/42; H04L 9/0869; H04L 2209/34

USPC ...................................... 713/189; 380/38, 42
See application file for complete search history.

(56) References Cited

U.S. PATENT DOCUMENTS 3,925,611 A * 12/1975 Dennis ................ H04L 25/4917
341/76
5,894,517 A *  4/1999 Hutchison ......... H04L 25/03866
380/268

(Continued)

OTHER PUBLICATIONS

Extended European Search Report dated Aug. 23, 2016; Application No. 16159759.6—(7) pages.

*Primary Examiner* — Mohammed Waliullah
(74) *Attorney, Agent, or Firm* — Boyle Fredrickson, SC

(57) ABSTRACT

A method of transmitting high speed serial data with reduced levels of radiated emissions is disclosed. A transmitting device scrambles data utilizing a pseudo-random number sequence generator. Scrambling the data eliminates transmission of repeated data sequences. The transmitting device similarly scrambles idle pairs of data between data transmissions to eliminate an additional source of repeated data sequences. The scrambled and encoded data is transmitted to a receiving device. The receiving device also includes a pseudo-random number sequence generator. Synchronization of the two pseudo-random number sequence generators occurs by utilizing control characters of the data frame being transmitted. Each of the pseudo-random number sequence generators is configured to generate the same sequence of numbers and is initialized to start with a first number in the sequence of numbers corresponding to the first byte of data being transmitted or received.

19 Claims, 4 Drawing Sheets

(51) Int. Cl.
*H04L 9/08* (2006.01)
*H04B 15/04* (2006.01)

(56) References Cited

U.S. PATENT DOCUMENTS

| | | | | |
|---|---|---|---|---|
| 6,694,496 | B2* | 2/2004 | Goslin | H04B 1/707 |
| | | | | 375/E1.007 |
| 7,801,121 | B1 | 9/2010 | Van Wageningen et al. | |
| 7,876,900 | B1* | 1/2011 | Goergen | H04K 1/00 |
| | | | | 380/255 |
| 8,683,572 | B1* | 3/2014 | Mahalingaiah | H04L 63/08 |
| | | | | 370/389 |
| 8,792,537 | B2* | 7/2014 | Hayes | H04B 15/04 |
| | | | | 375/219 |
| 8,831,508 | B2* | 9/2014 | Rasmussen | H04R 25/552 |
| | | | | 370/506 |
| 2003/0023986 | A1* | 1/2003 | Honmura | G11B 27/105 |
| | | | | 725/134 |
| 2006/0029100 | A1 | 2/2006 | Dove | |
| 2006/0093147 | A1 | 5/2006 | Kwon et al. | |
| 2009/0010157 | A1* | 1/2009 | Holmes | H04L 47/10 |
| | | | | 370/230.1 |
| 2010/0005365 | A1* | 1/2010 | Buchmann | H03M 13/13 |
| | | | | 714/758 |
| 2010/0275147 | A1* | 10/2010 | Kaufman | G06Q 30/0202 |
| | | | | 715/771 |
| 2012/0211787 | A1* | 8/2012 | Bader | H01L 33/405 |
| | | | | 257/98 |
| 2015/0312037 | A1* | 10/2015 | Newman | H04L 9/0869 |
| | | | | 380/268 |

\* cited by examiner

METHOD AND APPARATUS FOR SCRAMBLING A HIGH SPEED DATA TRANSMISSION

BACKGROUND OF THE INVENTION

The subject matter disclosed herein relates to a method and apparatus for scrambling a high speed data transmission between modules in an industrial controller, and more specifically, a method for distributing data within the data transmission to reduce emissions radiated from electrical conductors carrying the data.

Industrial controllers are specialized computer systems used for the control of industrial processes or machinery, for example, in a factory environment. Industrial controllers differ from conventional computers in a number of ways. Physically, they are constructed to be substantially more robust against EMI, shock, and damage and to better resist extreme environmental conditions than conventional computers. The processors and operating systems are optimized for real-time control and are programmed with languages designed to permit rapid development of control programs tailored to a constantly varying set of machine control or process control applications.

Generally, an industrial controller executes a stored control program that reads inputs from a variety of sensors associated with the controlled process or machine. Sensing the conditions of the process or machine and based on those inputs and the stored control program, the industrial controller determines a set of outputs used to control actuators for the process or machine. Several communication steps typically occur during the process of sensing the conditions and setting the outputs. Input modules receive signals from sensors and other devices distributed about the controlled process or machine. The input modules communicate the received signals to a processor module. The processor module executes the control program to generate output signals based on the program and received inputs. The processor module communicates the output signals to output modules. The output modules convert the output signals to analog and/or digital signals to be transmitted to an actuator or other such device distributed about the controlled process or machine.

Over time, the complexity and/or size of the machine or process controlled by the industrial controller has increased. For example, a process line may span the entire length of a bay in an industrial complex or an automated storage system may be distributed over an entire warehouse. As a result, the number of Input and Output (I/O) modules required to control the process or machine has increased. Each of the I/O modules communicates with the processor module and, potentially, with other modules in the industrial controller. Thus, an increased volume of communications within the industrial controller is required. Further, as processor speeds increase, the processors are able to transmit the increasing volume of data at higher transmission rates.

As is known to those skilled in the art, differential receivers have allow the rate of data transmission and the distance between devices communicating with each other to increase. However, the increased rate of transmission is not without drawbacks. High speed transmission protocols require continuous transmission of data patterns to keep clocks on the transmitting and receiving devices synchronized. In addition, the data must remain DC neutral, meaning that the number of zeros and ones remain substantially the same during transmission. However, neither of these constraints is consistent with real data that is typically transmitted. As a result, encoding schemes have been developed to convert intermittent data transmission to continuous data transmission. One such encoding scheme is 8B10B encoding. The 8B10B encoding scheme ensures that there are no extended sequences of data bits without a transition between a zero and a one and also ensures that the number of zeros and ones being transmitted remains DC neutral.

However, these encoding schemes are not without certain, drawbacks. In order to ensure that the clocks remain synchronized and that data transitions continually occur, additional data (for 8B10B encoding the additional data is commonly referred to as idle pairs) is inserted between data packet transmissions. Each idle pair includes a pair of control characters such that a receiver may identify the idle pair as such rather than as transmitted data. If an extended period of time exists between data frames to be transmitted, the idle pair is repeated continually during this period of time. As a result of the concentration of idle pairs, identical data is being continuously transmitted, resulting in a concentration of energy at specific frequencies. This concentration of energy tends to cause excessive emissions at these frequencies.

Thus, it would be desirable to provide a method of transmitting high speed serial data with reduced levels of radiated emissions.

BRIEF DESCRIPTION OF THE INVENTION

The subject matter disclosed herein describes a method of transmitting high speed serial data with reduced levels of radiated emissions. A transmitting device scrambles data utilizing a pseudo-random number sequence generator. Scrambling the data eliminates transmission of repeated data sequences. After scrambling, the data may be encoded using, for example, 8B10B encoding. The transmitting device similarly scrambles idle pairs of data in the 8B10B encoding to eliminate an additional source of repeated data sequences. The scrambled and encoded data is transmitted to a receiving device. The receiving device also includes a pseudo-random number sequence generator. Synchronization of the two pseudo-random number sequence generators occurs by utilizing control characters of the data frame being transmitted. Each of the pseudo-random number sequence generators is configured to generate the same sequence of numbers and is initialized to start with a first number in the sequence of numbers corresponding to the first byte of data being transmitted or received.

According to one embodiment of the invention, a system to reduce emissions on a communication bus in an industrial controller is disclosed. The communication bus links a transmitting device and a receiving device. The transmitting device is configured to generate data for transmission via the communication bus and includes a first scrambling element operative to scramble the generated data prior to transmission. The receiving device is configured to receive data transmitted via the communication bus and includes a second scrambling element operative to unscramble the received data. The second scrambling element is synchronized with the received data.

According to another embodiment of the invention, a method of reducing emissions from data communication between a first module and a second module in an industrial controller is disclosed. Data to be transmitted from the first module is scrambled utilizing a first scrambling element in the first module. The scrambled data is transmitted from the first module to the second module via a communication bus in the industrial controller. A second scrambling element in the second module is synchronized with the data received via the communication bus. The data received at the second module is unscrambled with the second scrambling element.

According to still another embodiment of the invention, a system to reduce emissions generated by a module transmitting data on a backplane in an industrial controller is disclosed. The system includes a scrambling element operable to generate a pseudo random sequence of numbers and a processing core. The processing core is operable to generate multiple bytes of data to be communicated via the backplane. The processing core initializes the scrambling element to a first number in the pseudo random sequence of numbers and scrambles the data to be communicated via the backplane. The data is scrambled by logical combining a first byte of data, selected from the multiple bytes of data, and the first number in the pseudo random sequence of numbers. Each successive byte of data is logically combined with each successive number from the pseudo random sequence of numbers. The system further includes a communication bus operable to conduct the scrambled data from the processing core to a backplane connector, where the backplane connector is operable to transfer the scrambled data from the communication bus to the backplane.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
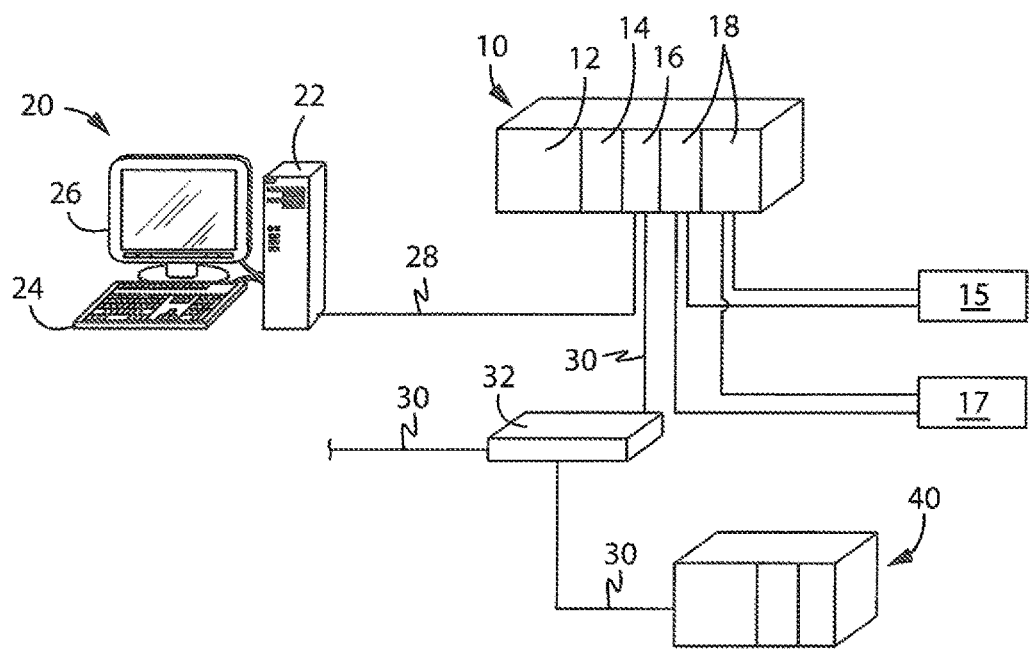
FIG. 1 is an exemplary environmental view of an industrial controller incorporating one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes al technical equivalents which operate in a similar manner to accomplish a similar purpose. For example, the word "con-nected," "attached," or terms similar thereto are often used. They are not limited to direct connection but include connection through other elements where such connection is recognized as being equivalent by those skilled in the art.

DETAILED DESCRIPTION

Figure 2:
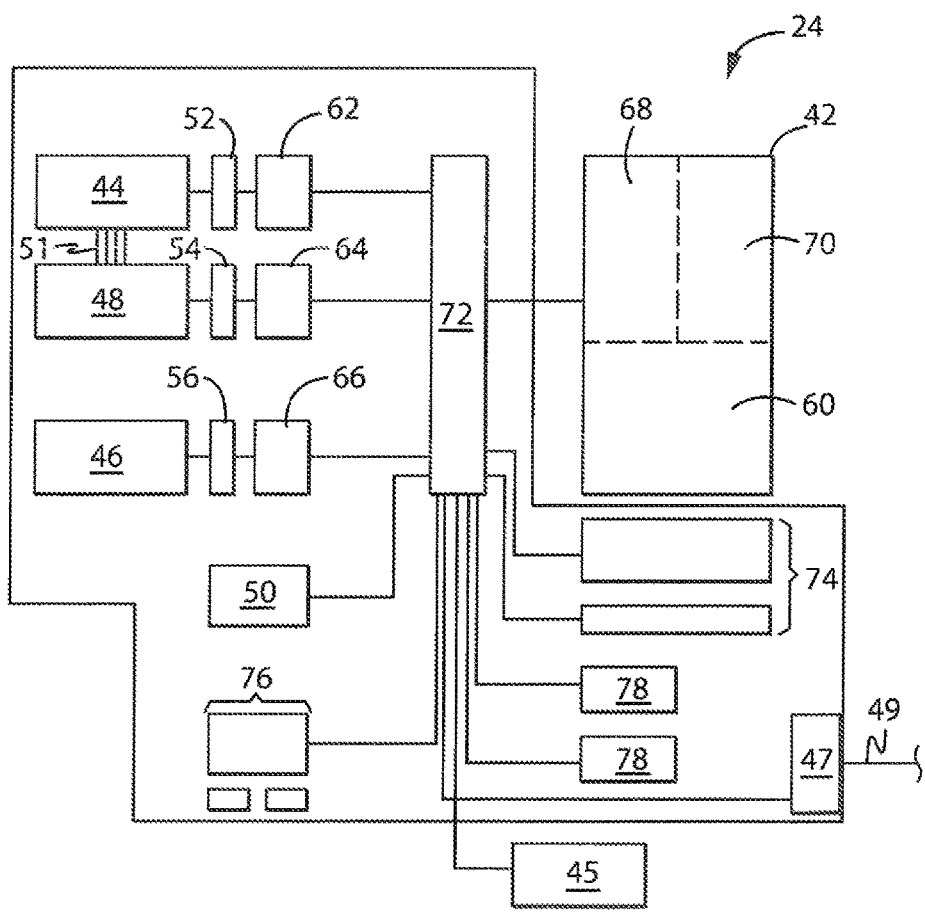
FIG. 2 is a block diagram representation of a processor module from the industrial controller of FIG. 1.

Turning initially to FIG. 1, an exemplary industrial control system includes an industrial controller 10 configured to operate an industrial machine or process. As illustrated, the industrial controller 10 is modular and may be made up of numerous different modules connected together in a rack or mounted to a rail. Additional modules may be added or existing modules removed and the industrial controller 10 reconfigured to accommodate the new configuration. Optionally, the industrial controller 10 may have a predetermined and fixed configuration. The illustrated industrial controller 10 includes a power supply module 12, a processor module 14, a network module 16 and two additional modules 18 that may be selected according to the application requirements and may be, for example, analog or digital input or output modules. According to the illustrated control system, a first controlled device 15 and a second controlled device 17 are each connected to the additional modules 18. With reference also to FIG. 2, each of the modules 12, 14, 16, and 18 may communicate via a backplane 49 of the industrial controller 10 and backplane connector 47 on each module. As a result, the controlled devices 15, 17 may transmit input and output signals between each device and the processor module 14 via the I/O module 18 and the backplane 49. The processor module 14 executes a control program to control operation of the device 15, 17 as well as any additional devices on the controlled machine or process.

One or more operator interfaces 20 may be connected to the industrial control network. Each operator interface 20 may include a processing device 22, input device 24, including, but not limited to, a keyboard, touchpad, mouse, trackball, or touch screen, and a display device 26. It is contemplated that each component of the operator interface may be incorporated into a single unit, such as an industrial computer, laptop, or tablet computer. It is further contemplated that multiple display devices 26 and/or multiple input devices 24 may be distributed about the controlled machine or process and connected to one or more processing devices 22. The operator interface 20 may be used to display operating parameters and/or conditions of the controlled machine or process, receive commands from the operator, or change and/or load a control program or configuration parameters. An interface cable 28 connects the operator interface 20 to the industrial controller 10.

The industrial controller 10 may be connected to other devices by one or more networks according to the application requirements. As illustrated, a network cable 30 connects the network module to a network switch 32. The network switch 32 is connected to a remote rack 40 by a second network cable 30. Still another network cable 30 extends from the network switch 32 to an external network, such as the Internet or a corporate intranet. It is contemplated that each network cable 30 may be a custom cable configured to communicate via a proprietary interface or may be any standard industrial cable, including, but not limited to, Ethernet/IP, DeviceNet, or ControlNet. Each network module 16 and network switch 32 is configured to communicate according to the protocol of the network to which it is connected and may be further configured to translate messages between two different network protocols.

The processor module 14 may include a single processing core or multiple processing cores executing independently or in cooperation, with each other. Referring next to FIG. 2, one embodiment of the processor module is illustrated. The illustrated processor module 14 has multiple processing cores 44, 46, and 48 communicating with a first memory 42 and a second memory 45. Each of the processing cores 44, 46, and 48 may be implemented using separate processor chips. Optionally, one or more of the processing cores 44, 46, and 48 may be implemented on a custom device, such as a field programmable gate array (FPGA) or an application specific integrated circuit (ASIC). It is further contemplated that each of the first memory 42 and the second memory 45 may include a single device or multiple devices. The first memory 42 may be volatile memory and the second memory 45 may be non-volatile memory. Each of the first and the second memory 42, 45 are typically, but need not be, physically separate devices from the processing cores 44, 46, and 48. Optionally, either the first or second memory 42, 45 may be incorporated on a custom device, such as an FPGA or ASIC with one or more of the processing cores 44, 46, and 48.

In the illustrated embodiment, the multicore processor includes two general-purpose cores 44 and 46 and a specialized reduced instruction set (RISC) core 48, the latter optimized for the execution of industrial control instructions such as relay ladder logic instructions. The main core 44 and the RISC core 48 may execute in parallel and use a coprocessor interface 51 for communications between the two processing cores 44, 48. Each processing core 44, 48 may also have a separate cache memory 52 and 54, respectively, with which they are operatively connected. The auxiliary core 46 similarly includes a separate cache memory 56 with which it is operatively connected. Each cache memory 52, 54 and 56, as is understood in the art, allows rapid access to the first memory 42 through standard cache coherence protocols. Having separate caches 52 and 54 for the cores 44 and 48 together with the coprocessor interface 51 allows the cores 44 and 48 to run concurrently and allows the core 44 to run and handle interrupts while core 48 is concurrently executing a control program.

Each of the cores 44, 48 and 46 are also associated with a memory management unit 62, 64 and 66 operating to map a virtual memory address space to actual addresses in the memory 42. The memory management units may also define exclusive memory portions 68, 70 for different processing cores and a mutual memory portion 60 that may be accessed by and provides communication between all of the processing cores processing cores 44, 46, 48. Communication between the each core 44, 48, and 46 and memory 42 (via the caches 52, 54 and 56 and memory management units 62, 64, and 66) occurs via a bus 72. The bus 72 further provides a common communication path with non-volatile memory 45, interrupt circuitry 74, synchronization clock circuitry 76, hardware devices 78, and a backplane connector 47 to a backplane 49 of the industrial controller 10. The hardware devices 78 may, for example, include network interface chips or USB devices or the like. Also illustrated, is a scrambling element 50. The scrambling element 50 is in communication with each of the processing cores 44, 46, 48 and the backplane connector 47 via the bus 72. Optionally, the scrambling element 50 may be incorporated within one of the processing cores 44, 46, 48.

Figure 3:
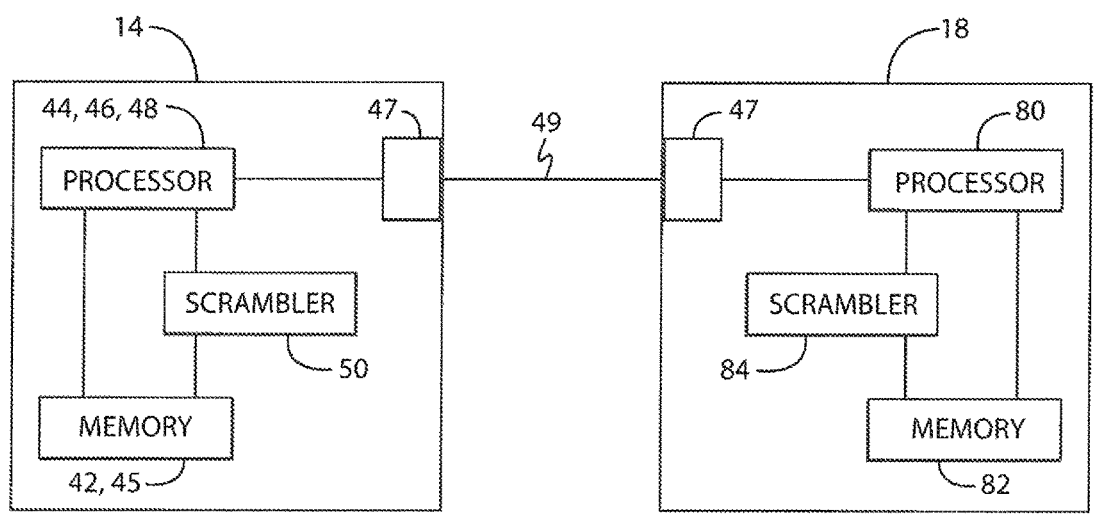
FIG. 3 is a block diagram representation of a processor module and an additional module from the industrial controller of FIG. 1.

Referring next to FIG. 3, an exemplary connection between a processor module 14 and an additional module 18 is illustrated. The additional module 18 includes a processor 80 which may be a single processing core or multiple processing cores executing independently or in cooperation with each other and which may be implemented using a single or separate processor chips. Optionally, the processor 80 may be implemented on a custom device, such as a field programmable gate array (FPGA) or an application specific integrated circuit (ASIC). The processor 80 is in communication with a memory device 82. The memory device 82 may include a single device or multiple devices and may be volatile memory, non-volatile memory, or a combination thereof. The memory device 82 may be, but need not be, a physically separate device from the processor 80. Optionally, the memory device 82 may be incorporated on a custom device, such as an FPGA or ASIC with the processor 80. The additional module 18 also includes a scrambling element 84 similar or identical to the scrambling element 50 on the processor module 14. The scrambling element 84 is in communication with the processor 80 and the backplane connector 47. Optionally, the scrambling element 84 may be incorporated within the processor 80.

At least a portion of the data to be transmitted between the industrial controller modules 14, 18 will be scrambled prior to transmission. According to the illustrated embodiment of the invention, each of the industrial controller modules 14, 18 includes a scrambling element 50, 84. It is contemplated that each scrambling element 50, 84 may include a dedicated logic circuit (such as the linear feedback shift register illustrated in FIG. 6). Optionally, the scrambling element 50, 84 may be incorporated within one of the processors 44, 46, 48, 80 of the respective industrial controller module 14, 18. Each scrambling element 50, 84 preferably utilizes the same method of scrambling and unscrambling such that either of the industrial controller modules 14, 18 may scramble or unscramble the data to be communicated. An exemplary transmission from the processor module 14 to the additional module 18 may be initiated by generation of data to be transmitted in one of the processor cores 44, 46, 48. According to one embodiment of the invention, all, or a portion of the data to be transmitted may be passed to the scrambling element 50, the portion of the data to be scrambled is scrambled, and the scrambled data is returned to the processor core 44, 46, 48. Optionally, the scrambling element 50 may generate a pseudo-random number sequence which is passed to the processor core 44, 46, 48. The processor core 44, 46, 48 may utilize the pseudo-random number sequence to scramble the portion of the data to be scrambled. The scrambled data is then passed to the backplane 49 via the backplane connector 47 in the processor module 14.

The additional module 18 receives the scrambled data from the backplane 49 via its respective backplane connector 47. The scrambled data is passed to the processor 80 for descrambling. According to one embodiment of the invention, the data to be unscrambled may be passed to the scrambling element 50, unscrambled, and returned to the processor 80. Optionally, the scrambling element 84 in the receiving device 18 is synchronized with the scrambling element 50 in the transmitting device 14 such that the scrambling element 84 in the receiving device 18 generates the same pseudo-random number sequence as generated in the transmitting device 14. The pseudo-random number sequence may be generated and passed to the processor 80 in the receiving device 18. The processor 80 utilizes the pseudo-random sequence to descramble the portion of data that was scrambled. Return data may be transmitted from the additional module 18 to the processor module 14 by the steps described above with the additional module 18 performing the scrambling steps and the processor module 14 performing the unscrambling steps. It is further contemplated that the scrambled communications described above may be performed, for example, by two processing cores within a single module if each processing core incorporates a scrambling element.

It is contemplated that each of the modules 12, 14, 16, and 18 within a common rack of the industrial controller 10 are configured to communicate scrambled data via the backplane 49. Each module 12, 14, 16, and 18 will include a backplane connector 47, communication bus, volatile and/or non-volatile memory, scrambling element, and one or more processing cores to handle communications between modules via the backplane 49. Preferably, the transmission rate is of a sufficient rate to allow data to be transmitted without requiring excessive processing bandwidth for each module. According to one embodiment of the invention, the backplane 49 is implemented utilizing a one gigabaud per second interface, such as the Serial Gigabit Media Interface (SGMII).

In addition to scrambling data, data to be transmitted between modules may also be encoded. According to one embodiment of the invention, data packets are transmitted between modules on the backplane 49 utilizing 8B10B encoding. In 8B10B encoding, eight bit (8B) data is converted to ten bit (10B) data. Because the number of potential combinations of eight bit data (i.e., 256 combinations) is less than the number of potential combinations of ten bit data (1024 combinations), the 8B10B encoding maps the potential combinations of eight bit data to those combinations of ten bit data that include four or less consecutive ones (1's) or zeros (0's). In addition, each combination of eight bit data is mapped to two different ten bit data combinations. One combination includes slightly more ones than zeros (i.e. positive disparity) and the other combination includes slightly more zeros than ones (i.e., negative disparity). The transmitter tracks the disparity of the data being transmitted and selects one of the combinations to maintain zero disparity during transmission. In other words, a portion of the data is encoded using the positive disparity combination and a portion of the data is encoded using the negative disparity combination. In this manner, the data transmission remains DC neutral.

Figure 4:
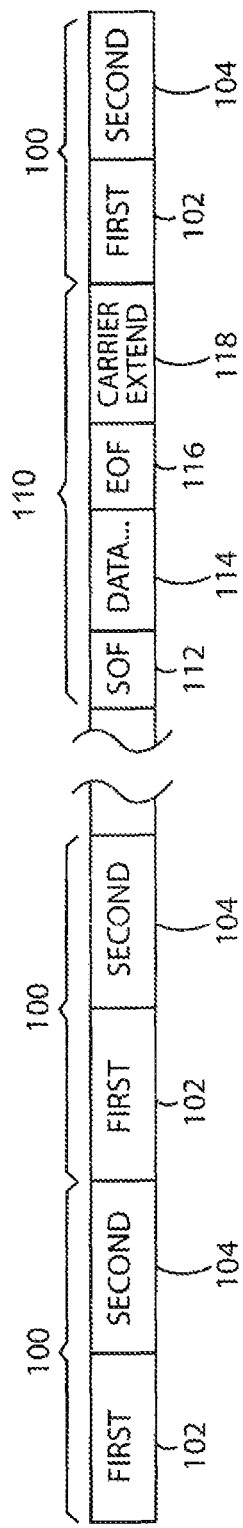
FIG. 4 is a byte sequence diagram representation of a data packet and a series of idle pair packets utilized by 8B10B encoded data.

Referring next to FIG. 4, an exemplary series of 8B10B data transmissions is illustrated. During periods of time in which no data is being transmitted, the 8B10B protocol requires that an idle pair 100 be transmitted. Each idle pair 100 includes a first character 102 and a second character 104. As discussed above, 8B10B encoding converts 8 bit data to 10 bit data in which no 10 bit character has more than four consecutive ones or zeros. However, the first and second characters 102, 104 in each idle pair are special characters. One of the characters 102, 104 is sometimes referred to as a comma character and has five (5) consecutive ones (1's) and the other of the characters 102, 104 is sometimes referred to as an inverse comma character and has five consecutive zeros (0's). As a result, a receiving device readily identifies the idle pairs 100 being transmitted. When data is to be transmitted, a data packet 110 is generated by the transmitting device. Each data packet 110 includes a start of frame (SOF) 112 character and an end of frame character (EOF) 116. The SOF 112 and the EOF 116 are appended to the beginning and the end, respectively, of the data 114 to be transmitted. In addition, at least one carrier extend character 118 is appended to the end of the data packet 110. If the data 114 includes an even number of bytes, two carrier extend characters 118 are appended. If the data 114 includes an odd number of bytes, one carrier extend character 118 is appended.

Figure 5:
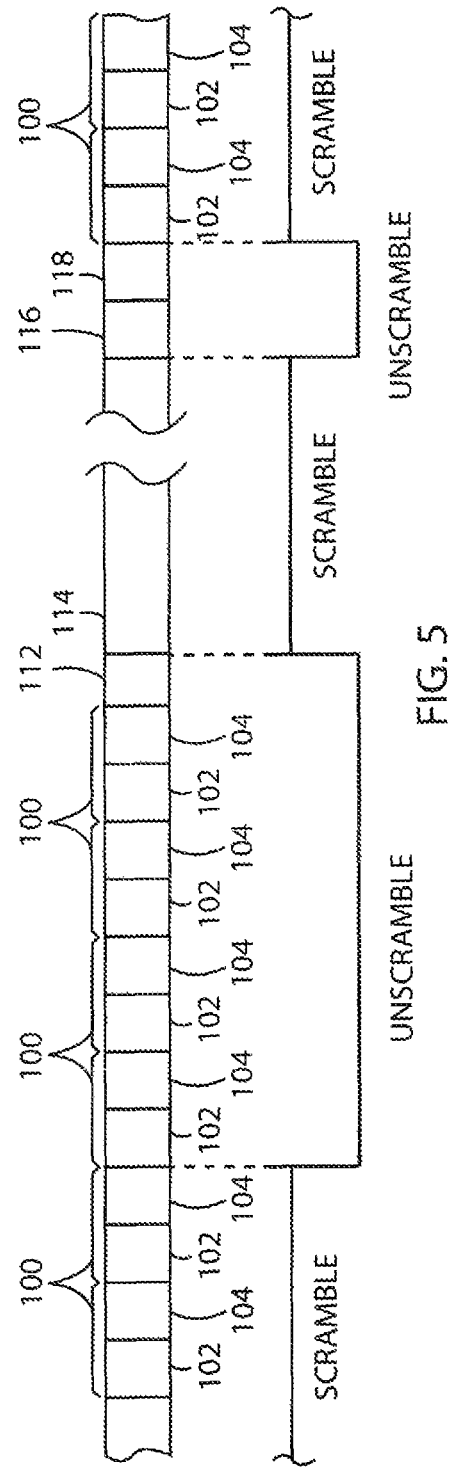
FIG. 5 is a byte sequence diagram representation of the data packet and idle pairs of FIG. 4 illustrating scrambling according to one embodiment of the invention.

Referring next to FIG. 5, the present invention scrambles at least a portion of the 8B10B transmission in order to reduce repetitive data transmissions. As discussed above, the continuous transmission of idle pairs 100 between data packets 110 results in a concentration of energy at a specific frequency. This concentration of energy results in undesirable emissions at those frequencies being radiated from the backplane 49 or other communication medium on which the 8B10B characters are being transmitted. Using a random, or pseudo-random, scrambling technique on the data prior to transmission reduces the repetitive content within the data transmissions, thereby spreading the energy across a range of frequencies and reducing the undesirable emissions radiated from the backplane 49 at the specific frequency. According to the illustrated embodiment, the idle pairs 100 are scrambled until the four idle pairs 100 to be sent prior to a new data packet 110. The four idle pairs 100 prior to a new data packet 110 will be transmitted without scrambling. In addition, the control characters of the data packet 110, for example, SOF 112, EOF 116, and carrier extend 118 characters will be transmitted without scrambling.

The data 114 within a data packet 110 may be transmitted as scrambled or unscrambled data. In an industrial control system, it is possible that a portion, or all, of the data 114 transmitted between two devices may remain constant for an extended period of time. For example, a single bit of data may change as the result of the change in status of a sensor while the remainder of the data remains the same. According to another example, a station within the control system may remain idle while a process performs at another station. Because nothing is occurring at the idle station, the data transmitted remains generally unchanged. Although the status of the station and, therefore, the data about the station being transmitted is not changing or is changing only a little, the station typically reports its status at a periodic interval to either the processor module 14 executing the main control program or an intermediate module between the station and the processor module 14. As a result, the data 114 being transmitted may similarly include repetitive transmission of unchanging data and generate undesired emissions on the backplane 49. Each module transmitting data, therefore, may be configured to scramble the data 114 within the data packet 110 to further reduce the repetitive data being transmitted.

According to one embodiment of the invention, each module which transmits scrambled data may include a parameter stored in its respective memory to select whether to scramble data 114. Data 114 that is scrambled prior to transmission requires unscrambling at the receiving device. However, legacy devices may not include a scrambling element. Having the parameter to select whether data 114 is scrambled allows a device with a scrambling element 50, 84 to be configured to operate with devices that either do or do not have a scrambling element 50, 84. Although idle pairs 100 will still be scrambled prior to transmission, sending four unscrambled idle pairs 100 prior to transmission of a data packet 110 permits both new or legacy devices to synchronize communications with the transmitting device prior to transmission of the data packet 110. If the transmitting device is communicating with a device that includes a scrambling element 50, 84, the parameter may be selected to scramble data and, thereby, reduce undesirable emissions from repetitive data 114 being transmitted. It is further contemplated that the memory may store a table in which multiple devices and whether they accept scrambled data 114 may be defined. A transmitting device may first access the table and determine whether the intended recipient of a data transmission can unscramble data 114 and may send either scrambled or unscrambled data 114 on a device-by-device basis.

It is further contemplated that even if the receiving device includes a scrambling element 50, 84, the scrambled idle pairs 100 may be received and discarded without further processing. The idle pairs 100 contain no data of importance to the receiving device and, therefore, unscrambling the idle pairs 100 results in inefficient use of the processor on the receiving device. If the transmitting device is scrambling data 114, the receiving device can use the unscrambled control characters (e.g., SOF 112 and EOF 116) to start and stop unscrambling the data 114 being transmitted. When scrambled idle pairs 100 are again transmitted after a data packet 110 is complete, the receiving device may again discard the scrambled data.

Synchronization between a transmitting device and a receiving device requires at least three of four idle pairs 100 to be transmitted successfully between the devices. Thus, by transmitting four unscrambled idle pairs 100, the transmitting and receiving devices may become resynchronized prior to transmission of a data packet 110. It is further contemplated that even if no data is to be transmitted, four idle pairs 100 may be periodically transmitted in an unscrambled format to allow a transmitting and receiving device to resynchronize. The periodic transmission of unscrambled idle pairs 100 may help identify potential faults prior to the need to transmit data 114. If, for example, the transmitting and receiving devices do not successfully transmit four unscrambled idle pairs 100, a problem may exist either at one of the devices or in the communication medium connecting the devices. The transmitting device may generate a warning message and/or a fault condition to alert an operator of the condition.

Figure 6:
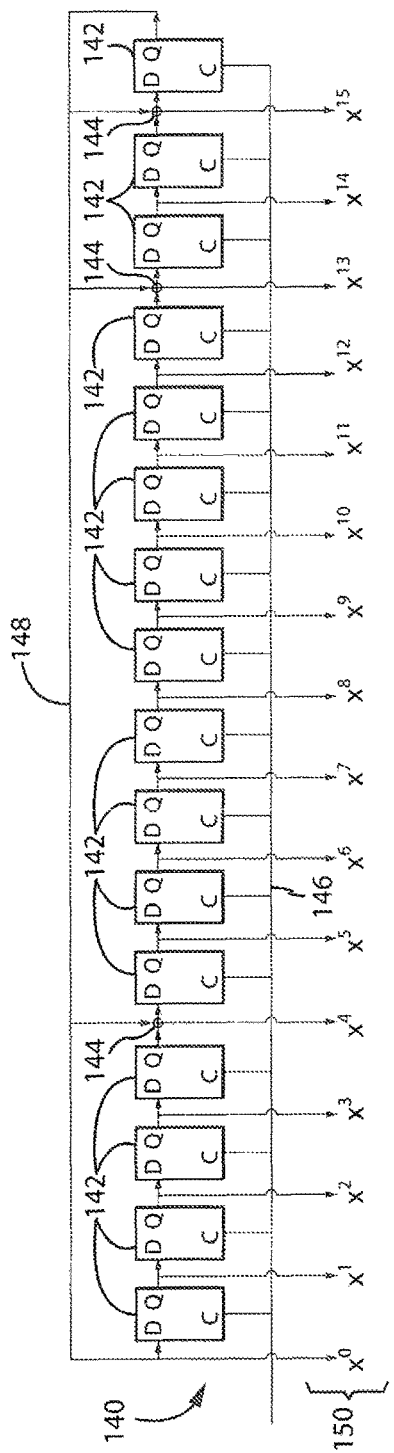
FIG. 6 is a schematic representation of a linear feedback shift register utilized to scramble data according to one embodiment of the present invention.

Scrambling of the idle pairs 100 and the data 114 is performed using pseudo-random number generation. According to one embodiment of the present invention, a linear feedback shift register (LFSR) 140 is utilized during scrambling. Referring next to FIG. 6, an exemplary LFSR 140 is illustrated. The LFSR 140 includes a series of D-Q flip flops 142 connected in series. A common clock signal 146 is connected to each of the D-Q flip flops 142 to synchronously pass data through the flip flops 142. The output 148 of the last D-Q flip flop 142 is fed back to the first D-Q flip flop 142. In addition, the output 148 of the last D-Q flip flop 142 is logically combined with the output of a selected number of the other D-Q flip flops 142. As illustrated, the output 148 of the of the last D-Q flip flop 142 and the output of the other selected D-Q flip flops 142 are logically combined using an Exclusive OR (XOR) gate 144. The order of the LFSR 140 is defined by the number of D-Q flip flops 142 connected in series. The selected D-Q flip flops 142 which are combined with the output 148 of the last D-Q flip flop 142 are defined by a characteristic polynomial for the LFSR 140. According to the illustrated embodiment, the characteristic polynomial of the LFSR is defined as shown in Equation 1. The XOR gates 144 are located at each of the interior terms of the characteristic polynomial (e.g., $x^{15}$, $x^{13}$, and $x^4$).

$$P(x)=x^{16}+x^{15}+x^{13}+x^4+1 \quad (1)$$

Figure 7:
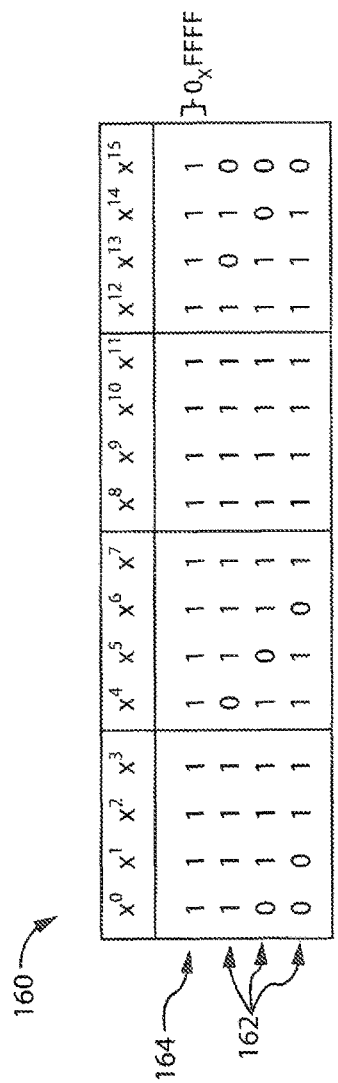
FIG. 7 is a tabular representation of a portion of the data sequences generated by the linear feedback shift register of FIG. 6.

With reference also to FIG. 7, the LFSR 140 generates a pseudo random sequence of numbers 162. An initial value (e.g., 0xFFFF) is loaded into the D-Q flip flops 142 to define an initial state 164 of the LFSR. After loading the initial value, the LFSR 140 generates a new sequence of logical ones (1's) and zeros (0's) on each subsequent clock cycle. The combination of ones and zeros at each clock cycle correspond to one of the numbers 162 generated by the LFSR 140. FIG. 7 illustrates a truth table 160 containing the first three numbers 162 generated by the LFSR 140. The sequence of numbers 162 is considered pseudo random because it will not repeat for $2^n-1$ clock cycles (where "n" is the order of the LFSR), and the number of logical ones is approximately equal to the number of logical zeros generated within the sequence of numbers 162. The output 150 of the LFSR 140 is logically combined with the data to be transmitted. According to one embodiment of the invention, the output 150 of the LFSR 140 is Exclusively ORed to the data to be transmitted. As a result, data to be transmitted that would otherwise be constant or slow to change now is changing each clock cycle as a result of being logically combined with the output 150 of the LFSR 140. Although the LFSR 140 in FIG. 6 is illustrated as an internal LFSR, it is contemplated that an external LFSR could be utilized. According to still other aspects of the invention, the LFSR may have a different degree or a different characteristic polynomial without deviating from the scope of the invention. It is further contemplated that still other embodiments of the invention may utilize other methods of scrambling the data.

In operation, one or more of the modules (12, 14, 16, or 18) in the industrial controller 10 utilize the scrambling and encoding methods described herein to reduce radiated emissions on the backplane 49 of the industrial controller 10. For purposes of description, an exemplary transmission will be discussed with the processor module 14 being the transmitting module and one of the additional modules 18 (an output module) as the receiving module. However, it is understood that any of the modules may be either the transmitting or the receiving module. One of the processor cores 44, 46, 48 generates data to be transmitted to the output module 18 in the industrial controller. The processor module 14 determines whether it is communicating with another module configured to unscramble data 114 or with a legacy module that cannot unscramble data 114. The processor module 14 may read, for example, from a parameter or a table in either the first or second memory 42, 45 whether the receiving device accepts scrambled data 114.

If the receiving device accepts scrambled data 114, the processor module 14 scrambles the data 114 prior to encoding. According to one embodiment of the invention, the processor core 44, 46, 48 resets an LFSR 140 executing in the scrambling element 50 to an initial value 164 prior to scrambling the data 114. The initial value may be a hexadecimal value of 0xFFFF, which loads all ones into each of the flip-flops 142. On subsequent clock cycles, each byte of data 114 is XORed with the output 150 of the LFSR 140. The logical combination of the output 150 of the LFSR 140 and the data may occur either in the scrambling element 50 or in the processor core 44, 46, 48. According to the illustrated embodiment, two bytes of data 114 may be XORed with the output 150 of the LFSR because the LFSR 140 has sixteen bits of output 150. Each byte, or two bytes, of data 114 is logically combined with the next number 162 in the sequence of numbers generated by the LFSR until all of the data 114 has been scrambled. It is contemplated that various other numbers of bits or logical combinations of the data 114 and the output 150 may occur without deviating from the scope of the invention. The scrambled data 114 may then be encoded for transmission via the backplane 49. If the receiving device does not accept scrambled data 114, the unscrambled data 114 is directly encoded for transmission via the backplane 49.

Encoding of the data 114 is performed using 8B10B encoding. Whether the data 114 is scrambled or unscrambled, it is then converted from eight bit data to ten bit format for transmission. As discussed above, the 8B10B encoding prevents long strings of consecutive ones or zeros from being transmitted and maintains a balance between the number of ones and zeros being transmitted. However, 8B10B encoding also introduces idle pairs 100 between each of the data packets 110 being transmitted. As a result, the processor module 14 next scrambles the idle pairs 100 generated from 8B10B encoding. The processor module 14 logically combines each idle pair 100 with the output 150 of the LFSR 140. However, the scrambled idle pairs 100 need not be unscrambled by the receiving module 18. As a result, the LFSR 140 does not need to be initialized to a predetermined value. The processor module 14 begins scrambling idle pairs 100 generated after a data packet 110 is complete and continues scrambling idle pairs 100 until there are four idle pairs 100 remaining prior to transmission of the next data packet 110. The processor module 14 transmits four unscrambled idle pairs 100 to the receiving module 18 to allow the receiving module to resynchronize with the transmitting module in the event the communication link between the modules was lost during transmission of the scrambled idle pairs 100. According to another aspect of the invention, the processor module 14 may be configured to periodically transmit four unscrambled idle pairs 100 during, an extended sequence of idle pairs 100 to help ensure that the data link remains established between transmissions of data packets 110. It is contemplated that the number of scrambled idle pairs 100 to be transmitted between unscrambled idle pairs 100 is configurable and may be set by a parameter stored in memory 42, 45. Preferably, at least 32 scrambled idle pairs 100 are transmitted between unscrambled idle pairs 100 to maintain a desired reduction in radiated emissions.

The receiving module 18 is capable of unscrambling the transmission to provide the data 114 to its processor 80 for subsequent action on the received data. According to the preferred embodiment, the receiving module 18 continually receives the transmitted, encoded data. The scrambled idle pairs 100 may be dropped by the receiving module 18. Upon receipt of an unscrambled idle pair 100, the receiving module 18 verifies that the link remains between the transmitting module 14 and the receiving module 18 and, if not, re-establishes the link during receipt of the subsequent idle pairs 100. Successful receipt of at least three of the four unscrambled idle pairs 100 allows the receiving module 18 to recover a lost link between the transmitting and the receiving modules. After receiving four unscrambled idle pairs 100, the receiving module 18 may either begin receiving additional scrambled idle pairs 100 or it may receive a SOF character 112 from the transmitting device 14.

Upon reception of the SOF character 112, the processor 80 on, the receiving module 18 prepares to unscramble the scrambled data 114. According to one embodiment of the invention, the receiving module includes an LFSR 140 executing in a scrambling element 84, where the LFSR 140 has the same order and same characteristic equation as the LFSR 140 in the transmitting module 14. The processor 80 resets the LFSR 140 executing in the scrambling element 84 to the same initial value 164 as the initial value 164 set in the LFSR 140 on the transmitting module 14 prior to unscrambling the data 114. The initial value may be a hexadecimal value of 0xFFFF, which loads all ones into each of the flip-flops 142. Thus, the LFSR 140 on the receiving module 18 begins generating the same sequence of numbers 162 to unscramble the data 114 as, the LFSR 140 on the transmitting module 14 generated to scramble the data 114. On subsequent clock cycles, the output 150 of the LFSR 140 is logically combined with the scrambled data 114 in an inverse manner to the logical combination performed on the transmitting module 14. In the illustrated embodiment, each byte of data 114 is again XORed with the output 150 of the LFSR 140. Executing an XOR, of the scrambled data 114 with the same number used to scramble the data 114 returns the scrambled data 114 to unscrambled data 114. The logical combination of the output 150 of the LFSR 140 and the data may occur either in the scrambling element 84 or in the processor 80. According to the illustrated embodiment, two bytes of scrambled data 114 may be XORed with the output 150 of the LFSR because the LFSR 140 has sixteen bits of output 150. Each byte, or two bytes, of scrambled data 114 is logically combined with the next number 162 in the sequence of numbers generated by the LFSR until all of the data 114 has been unscrambled. It is contemplated that various other numbers of bits or logical combinations of the data 114 and the output 150 may occur without deviating from the scope of the invention as long as the logical combination on the receiving module 18 corresponds to the logical combination performed on the transmitting module 14.

It should be understood that the invention is not limited in its application to the details of construction, and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system to reduce emissions from a communication bus in an industrial controller, the system comprising:
   a transmitting device including a first scrambling element, the transmitting device configured to:
   generate a plurality of data packets for transmission via the communication bus,
   scramble the plurality of data packets with the first scrambling element prior to transmission,
   insert a plurality of idle pairs between sequential data packets selected from the plurality of data packets,
   scramble at least a portion of the plurality of idle pairs inserted between sequential data packets with the first scrambling element prior to transmission,
   transmit a plurality of scrambled idle pairs after transmitting one of the sequential data packets;
   transmit a plurality of unscrambled idle pairs after transmitting the plurality of scrambled idle pairs and prior to transmitting another of the sequential data packets; and
   a receiving device configured to receive the plurality of data packets transmitted via the communication bus, the receiving device including a second scrambling element operative to unscramble the received data packets, wherein the second scrambling element is synchronized with the received data packets.

2. The system of claim 1 wherein:
the first scrambling element generates a sequence of scrambling numbers;
the second scrambling element generates the sequence of scrambling numbers; and
the first and the second scrambling elements are reset to a first value within the sequence of scrambling numbers by an initial control code for the data to be transmitted.

3. The system of claim 2 wherein:
the first scrambling element includes a first linear feedback shift register;
the second scrambling element includes a second linear feedback shift register;
the first linear feedback shift register is set to a predefined value when a start of frame control code is generated to transmit data; and
the second linear feedback shift register is set to the predefined value when the start of frame control code is received.

4. The system of claim 3 wherein a first characteristic equation defines the first linear feedback shift register, a second characteristic equation defines the second linear feedback shift register, and the first characteristic equation is the same as the second characteristic equation.

5. The system of claim 1 wherein the transmitting device is further configured to encode the generated data after the data is scrambled.

6. The system of claim 1 wherein the plurality of unscrambled idle pairs included prior to transmitting each of the plurality of data packets includes at least four unscrambled idle pairs.

7. The system of claim 6 wherein the receiving device receives the at least four unscrambled idle pairs and synchronizes the receiving device to the transmitting device via the unscrambled idle pairs.

8. The system of claim 1 wherein the first scrambling element periodically transmits at least four unscrambled idle pairs between scrambled idle pairs.

9. A method of reducing emissions from data communication between a first module and a second module in an industrial controller, the method comprising the steps of:
scrambling a plurality of data packets to be transmitted from the first module utilizing a first scrambling element in the first module;
inserting a plurality of idle pairs between sequential data packets selected from the plurality of data packets;
scrambling at least a portion of the plurality of idle pairs inserted between sequential data packets with the first scrambling element prior to transmission;
including a plurality of unscrambled idle pairs prior to transmitting each of the data packets;
transmitting the scrambled data packets, the scrambled portion of the plurality of idle pairs, and the unscrambled idle pairs from the first module to the second module via a communication bus in the industrial controller;
synchronizing a second scrambling element in the second module with the unscrambled idle pairs received via the communication bus; and
unscrambling the data packets received at the second module with the second scrambling element.

10. The method of claim 9 wherein the step of scrambling a plurality of data packets to be transmitted includes the steps of:
generating a pseudo random sequence of numbers with the first scrambling element; and
logically combining the data packets to be transferred with the pseudo random sequence of numbers.

11. The method of claim 10 wherein the step of unscrambling the data packets received includes the steps of:
generating the pseudo random sequence of numbers with the second scrambling element; and
logically combining the data packets received with the pseudo random sequence of numbers.

12. The method of claim 11 wherein:
the first scrambling element includes a first linear feedback shift register;
the second scrambling element includes a second linear feedback shift register;
the method includes an initial step of setting the first linear feedback shift register to a predefined value prior to scrambling data to be transmitted; and
the step of synchronizing the second scrambling element includes setting the second linear feedback shift register to the predefined value prior to unscrambling the received data.

13. The method of claim 9 further comprising the step of encoding data to be transmitted from the first module, wherein encoding data is performed after scrambling data and prior to transmitting the scrambled data.

14. The method of claim 13 further comprising the step of scrambling at least a portion of the encoded data in the first module utilizing the first scrambling element, wherein scrambling at least a portion of the encoded data is performed after encoding data and prior to transmitting data.

15. The method of claim 9 wherein the plurality of unscrambled idle pairs includes at least four unscrambled idle pairs prior to transmitting each data packet.

16. The method of claim 15 further comprising the step of synchronizing the receiving device to the transmitting device via the unscrambled idle pairs.

17. A system to reduce emissions generated by a module transmitting data on a backplane in an industrial controller, the system comprising:
a scrambling element operable to generate a pseudo random sequence of numbers;
a processing core operable to:
generate a plurality of data packets to be communicated via the backplane, wherein each data packet-includes a plurality of bytes of data,
initialize the scrambling element to a first number in the pseudo random sequence of numbers,
scramble each data packet to be communicated via the backplane, wherein each data packet is scrambled by a logical combination of a first byte of data, selected from the plurality of bytes of data, and the first number in the pseudo random sequence of numbers and each successive byte of data is logically combined with each successive number from the pseudo random sequence of numbers,
insert a plurality of idle pairs between sequential data packets selected from the plurality of data packets,
scramble at least a portion of the plurality of idle pairs inserted between sequential data packets with the scrambling element prior to transmission,
transmit a plurality of scrambled idle pairs after transmitting one of the sequential data packets,
transmit a plurality of unscrambled idle pairs after transmitting the plurality of scrambled idle pairs and prior to transmitting another of the sequential data packets; and
a communication bus operable to conduct the scrambled data and idle pairs from the processing core to a backplane connector, wherein the backplane connector is operable to transfer the scrambled data from the communication bus to the backplane.

18. The system of claim 17 wherein the scrambling element includes a linear feedback shift register.

19. The system of claim 18 wherein the processing core is further operable to encode the data after the data is scrambled.

* * * * *

UNITED STATES PATENT AND TRADEMARK OFFICE
CERTIFICATE OF CORRECTION

PATENT NO. : 9,898,611 B2  
APPLICATION NO. : 14/672825  
DATED : February 20, 2018  
INVENTOR(S) : Anthony G. Gibart, Kenwood H. Hall and Robert E. Lounsbury Page 1 of 1

It is certified that error appears in the above-identified patent and that said Letters Patent is hereby corrected as shown below:

In the Claims

Claim 17, Column 14, Line 43, replace "packet-includes," with "packet includes".

Signed and Sealed this
Seventeenth Day of April, 2018

Andrei Iancu
*Director of the United States Patent and Trademark Office*